United States Patent
Lee et al.

(10) Patent No.: US 8,213,089 B2
(45) Date of Patent: Jul. 3, 2012

(54) PROJECTING TYPE HYPER-LENS AND METHOD OF MANUFACTURING THE SAME

(75) Inventors: Wang-joo Lee, Daejeon-si (KR); Jeong-ho Ju, Seoul (KR); Dong-ho Kim, Daejeon-si (KR); Jae-ick Choi, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 347 days.

(21) Appl. No.: 12/614,850

(22) Filed: Nov. 9, 2009

(65) Prior Publication Data

US 2010/0134897 A1    Jun. 3, 2010

(30) Foreign Application Priority Data

Nov. 28, 2008 (KR) .................. 10-2008-0119981

(51) Int. Cl.
*G02B 3/00* (2006.01)
(52) U.S. Cl. ........................... 359/649; 359/634
(58) Field of Classification Search .................. 359/634, 359/649
See application file for complete search history.

(56) References Cited

U.S. PATENT DOCUMENTS

2010/0134898 A1* 6/2010 Shalaev et al. ................ 359/665

OTHER PUBLICATIONS

Zhaowei Liu, et al; "Far-Field Optical Hyperlens Magnifying Sub-Diffraction-Limited Objects", Mar. 23, 2007, vol. 315 Science www.sciencemag.org, p. 1686.

* cited by examiner

*Primary Examiner* — Joseph P Martinez
(74) *Attorney, Agent, or Firm* — Ladas & Parry LLP

(57) ABSTRACT

Disclosed are a projecting type hyper-lens and a method of manufacturing the same. The projecting type hyper-lens includes a main lens layer and a substrate layer. A front surface of the main lens layer is recessed. The substrate layer supports the main lens layer. A front central portion of the main lens layer protrudes beyond a surface of the substrate layer. The projecting type hyper-lens allows an object to move towards a front surface of the hyper-lens until a distance between the front surface of the hyper-lens and the object is smaller than a half-wavelength of light, and thus images an object smaller than a half-wavelength of used light. Evanescent waves scattered from an object is used in a manner convenient to a user.

6 Claims, 15 Drawing Sheets

FIG. 4
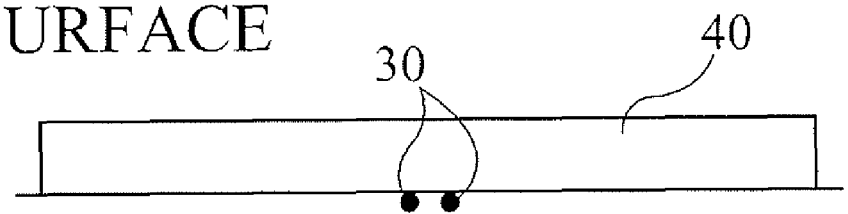
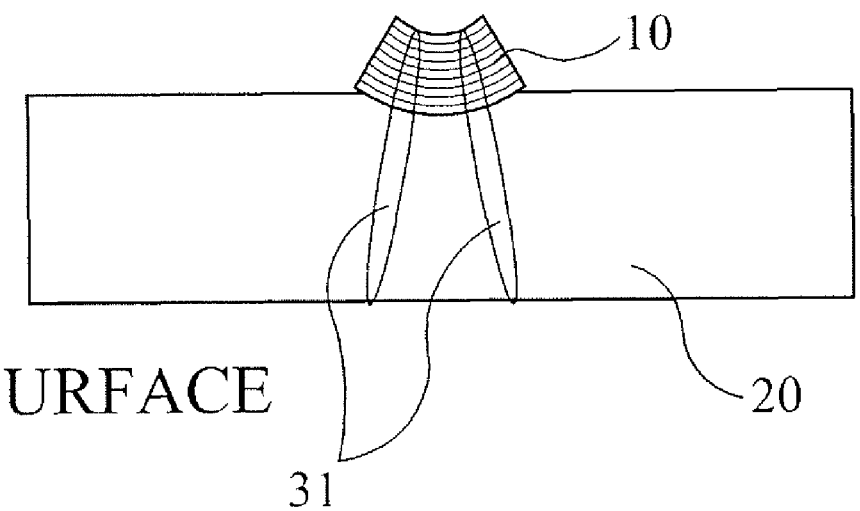

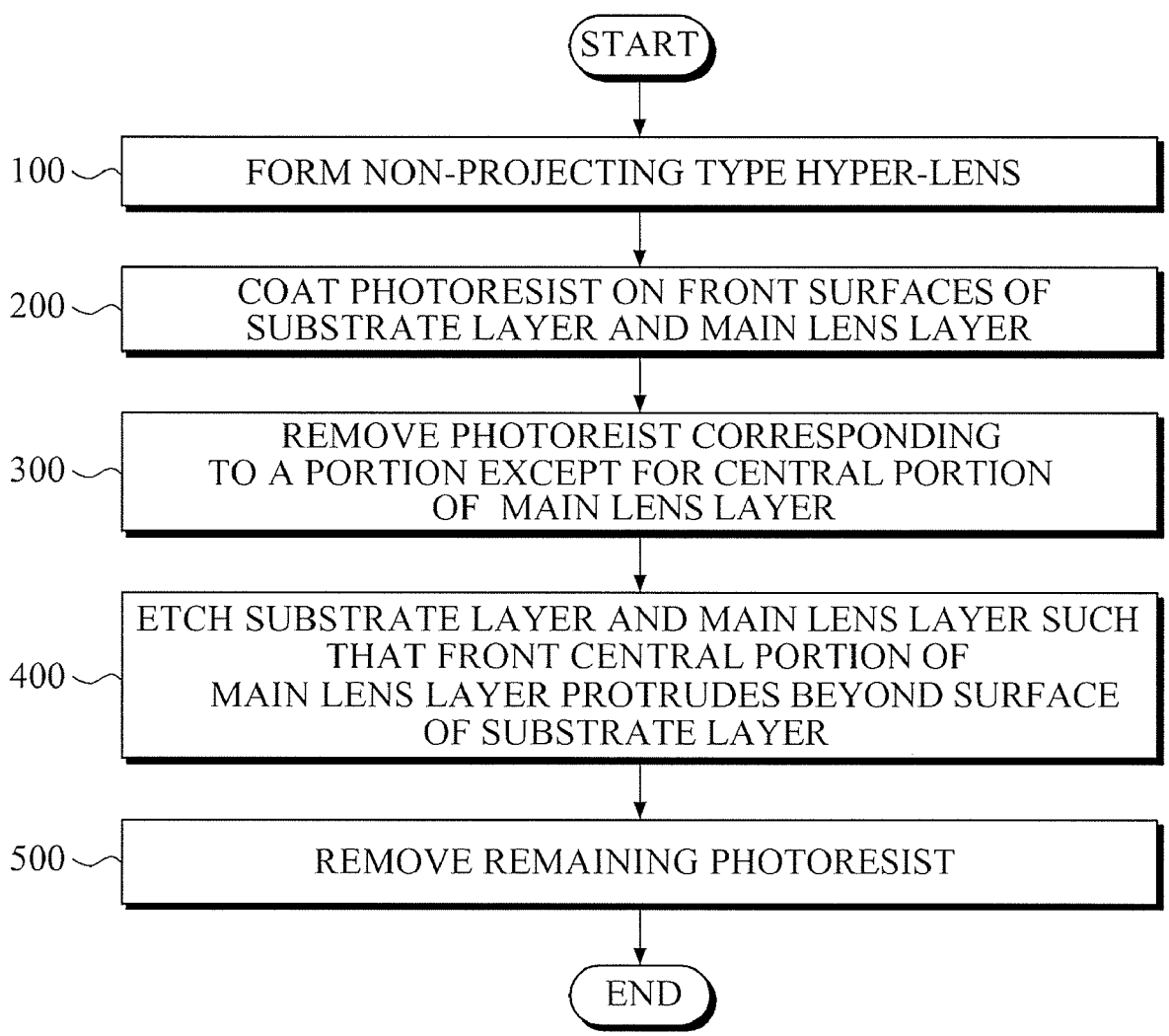

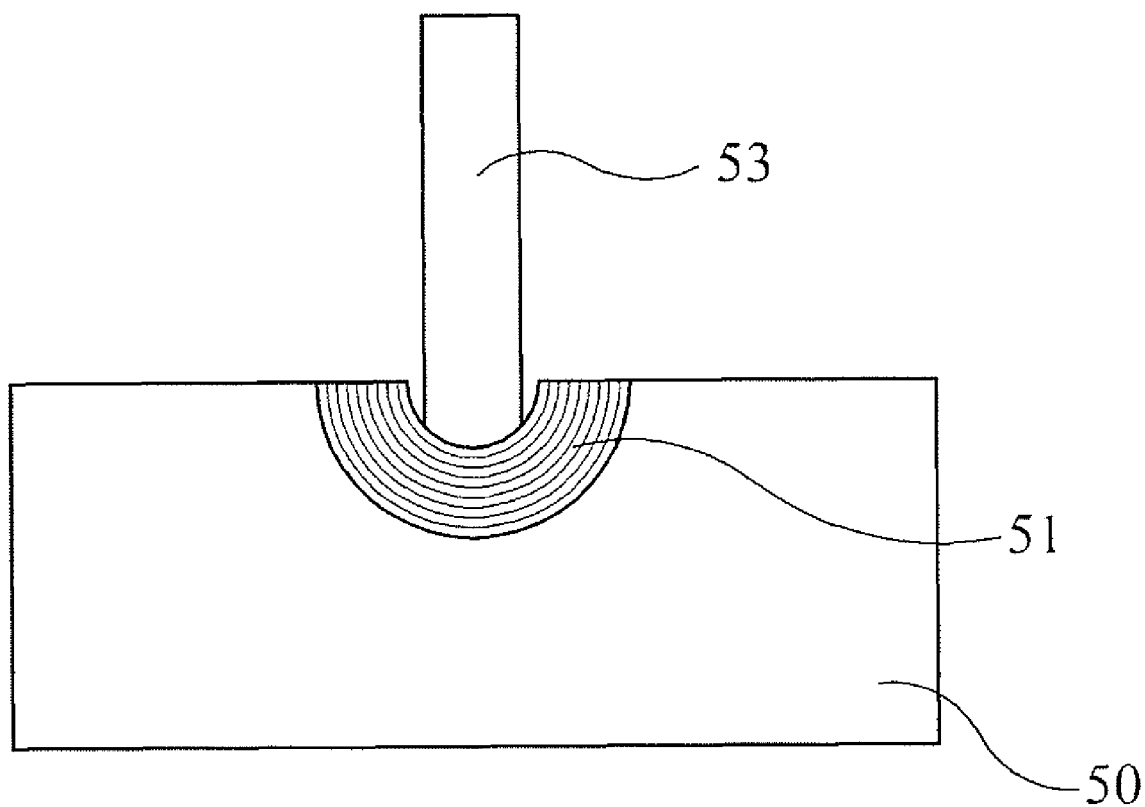

PROJECTING TYPE HYPER-LENS AND METHOD OF MANUFACTURING THE SAME

CROSS-REFERENCE TO RELATED APPLICATION

This application claims the benefit under 35 U.S.C. §119 (a) of Korean Patent Application No. 10-2008-0119981, filed on Nov. 28, 2008, the disclosure of which is incorporated by reference in its entirety for all purposes.

BACKGROUND

1. Field

The following description relates to a hyper-lens, and more particularly, to a projecting type hyper-lens for enlarging an image of the object while converting evanescent waves into propagating waves.

2. Description of the Related Art

The shape of an object can be recognized by imaging light (electromagnetic waves) scattered by the object. With regards to humans, some of the visible rays scattered from an object enter the eyeball, pass through the cornea, and crystalline lens where the visible rays are bent, and finally form an image on the retina where brightness and color of the light are sensed in cells of the retina. Optical signals obtained by sensing the brightness and color of the light are sent to the brain in a manner which allows human to recognize the object.

In general, a resolving power is a degree to which an optical system is able to discern the detail of an image. For example, when an optical system is loosely said as having a resolving power of 'd', the optical system is able to distinguish two objects spaced a minimum distance 'd' apart from each other. In optical theory, the resolving power obtainable by an optical instrument has an absolute minimum value which is half the value of the wavelength of light used in the optical device.

Accordingly, a conventional optical microscope has a resolving power of just under 200 nm corresponding to half of the shortest wavelength of visible light. If an object to be viewed has a dimension smaller than 200 nm, for example viruses or giant molecules, an electron microscope using an electron beam having a wavelength much shorter than that of visible rays is needed. However, an electron microscope is a highly complicated and expensive piece of equipment compared with an optical microscope.

As an alternative solution to the above problems, an optical microscope having an improved resolving power based on the characteristics of light has come to light. In general, the light scattered from an object has components of evanescent waves and propagating waves having different properties to each other. The propagating wave suffers low loss but offers a maximum resolution of half a wavelength. In the other hand the evanescent wave provides several times higher resolution than propagation wave but suffers very high loss. So in using evanescent wave for image formation the object should be roughly within a half wavelength from the front face of the imaging system. For example in the case of $\lambda/2$ dipole antenna, the emitted propagating wave and the evanescent wave have nearly equal amplitude at $\lambda/6$ distance from the antenna where $\lambda$ is the wavelength of the radiated electromagnetic wave and the evanescent wave attenuates to $1/10$ of the propagating wave around the half wave distance. FIG. 1A is a view showing characteristics of a conventional lens. As shown in FIG. 1A, a propagating wave 110 is unchanged when compared before and after passing through the conventional lens 101, but an evanescent wave 120 exhibits a significant decrease in intensity after passing through the convention lens 120.

Recently, a device known as a superlens has been developed which is capable of amplifying evanescent waves using surface plasmon [N. Fang, H. Lee, C. Sun, and X. Zhang, "Sub-diffraction-Limited Optical Imaging with a silver Superlens," Science 308, 534, 2005.]. That is, the superlens allows evanescent waves to be used in forming an image, exceeding a resolution limit of a convention lens. FIG. 1B is a view showing characteristics of a conventional superlens. As shown in FIG. 1B, the propagating wave 110 is unchanged when compared before and after passing through the superlens 102, whereas the intensity of an evanescent wave 120 passing through the superlens 102 is amplified but quickly decays after passage.

In this regard, in order for the superlens to amplify the evanescent wave scattered from an object, a distance between a front surface of the superlens and the object needs to be roughly smaller than a half-wavelength of the light. In addition, in order for the superlens to form an image using the amplified evanescent wave, a distance between a rear surface of the superlens and an image plane needs to be smaller than a half-wavelength of the light; and since the superlens offers a real size image, electron microscope is also needed to see the subwavelength image formed by a superlens.

On the other hand, the newly introduced hyperlens is capable of forming a magnified image using an evanescent wave. If a critical size is magnified up to a certain level such as over the half wavelength it is no longer an evanescent wave but a propagating wave. A hyperlens converts evanescent wave to propagating wave in this manner. Since the propagating wave has a low decay rate, the hyperlens can form a magnified image at a location remote from a rear surface of the hyperlens. FIG. 1C is a view showing characteristics of a conventional hyperlens. As shown in FIG. 1C, the propagating wave 110 is unchanged when compared before and after passing through the hyperlens 103, and the evanescent wave 120 passing through the hyperlens 103 changes into the propagating wave 110 and thus exhibits no substantial decrease in intensity. Since the image formed by the hyperlens is far field image and larger than half the wavelength, one can recognize an object having a size several times smaller than the wavelengths of visible light using a combined system of a hyperlens and an optical microscope.

But like superlens when imaging an object using a hyperlens, the object needs to move as close as possible to the front face of the hyper-lens such that evanescent waves coming from the object are incident onto the hyper-lens before considerable decay.

Since the front face of a conventional hyperlens is a recessed shape as the inner surface of a cylinder the access of the object and the front face of the hyper-lens may be seriously limited due to the substrate contact problem. In this case, a substrate layer where a main lens layer of the hyperlens is mounted may come into contact with the substrate where the object is mounted, thus the access of the object to the hyper-lens is limited.

SUMMARY

Accordingly, in one aspect, there is provided a hyperlens having an improved structure, which allows an object to be effectively moved towards a front surface of the hyperlens until a distance between a front surface of the hyper-lens and the object is smaller than a half-wavelength of the used light. In one general aspect, there is provided a projecting type hyper-lens for forming a magnified diffraction limited image of an object using an evanescent wave component of light coming from the object.

A conventional hyperlens is produced by staking a dielectric thin film and a metal thin film alternately as coaxial semi-cylinders in FIG. 5B [Z. Liu, H. S. Lee, Y. Xiong, C. sun, and X. Zhang, "Far-Field Optical Hyperlens Magnifying Sub-Diffraction-Limited Objects," Science. Vol. 315, p 1686, 2007.]. This alternately staked layers operate as an anisotropic metamaterial and ensures a small loss for the evanescent fields. Also the cylindrical structure provides magnification which is essential for the conversion of evanescent wave to propagating wave. But due to this structure, the object and the front face of the hyperlens cannot approach easily within a half wavelength.

The projecting type hyper-lens is made from the conventional hyperlens by etching out a depth of the peripheral region of the hyperlens with the surrounding substrate. In this case the object easily approach the front face of the hyperlens within a half wavelength as in FIG. 4.

In another general aspect, there is provided method of manufacturing a projecting type hyperlens. The projecting type hyperlens manufacturing method is performed as follows. First a non-projecting type hyper-lens is formed. The non-projecting type hyper-lens includes a substrate layer and a main lens layer supported by the substrate layer and has a recessed shape. A masking process using photoresist is performed such that a front central portion of the main lens layer is masked with the mask width smaller than the inner diameter of the main lens layer. The unmasked regions are subject to an etching such that the masked front central portion of the main lens layer protrudes beyond a surface of the substrate layer. And the photoresist used for masking is removed finally.

The masking of photoresist comprises coating photoresist on front surfaces of the substrate layer and the main lens layer; and removing a portion of the photoresist, which does not correspond to the central portion of the main lens layer.

In the etching process, the main lens layer is etched such that a foremost portion of the main lens layer is higher than the front central portion by a distance smaller than a half-wavelength of used light.

Side walls of the remained main lens layer are inclined such that the main lens layer has a cross sectional area which is larger toward a rear surface of the main lens layer.

The forming of the non-projecting type hyper-lens includes forming a groove having a semicylindrical shape or a semisphere shape in the front surface of the substrate layer; and forming the main lens layer in the groove through a stacking scheme.

In the forming of the non-projecting type hyper-lens, the main lens layer is formed by alternately stacking a dielectric substance thin film and a metal thin film against on each other on a bottom surface of the groove.

Each of the dielectric substance thin film and the metal thin film has a thickness of about 100 nm or less.

The dielectric substance thin film includes aluminum oxide ($Al_2O_3$) and the metal thin film includes silver (Ag).

As apparent from the above description, such a projecting type hyper-lens has a structure allowing an object to be effectively moved towards the hyper-lens until a distance between the object and the hyper-lens is smaller than a half-wavelength of used light. As a result, a far field image of an object smaller than a half-wavelength of used light can be formed using the evanescent waves scattered from an object.

In addition, according to the method of manufacturing the projecting type hyperlens, the projecting type hyperlens can be easily manufactured by using a conventional cylindrical hyperlens having a recessed shape.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 4 is a cross sectional view showing the projecting type hyper-lens shown in FIG. 2 in use;

FIG. 6 is a flowchart showing an exemplary method of manufacturing a projecting type hyperlens; and FIGS. 7A to 7F are cross sectional views showing an exemplary method of manufacturing a projecting type hyperlens based on a non-projecting type hyper-lens.

Elements, features, and structures are denoted by the same reference numerals throughout the drawings and the detailed description, and the size and proportions of some elements may be exaggerated in the drawings for clarity and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

Hereinafter, a projecting type hyper-lens will be described with reference to accompanying drawings.

Figure 1A:
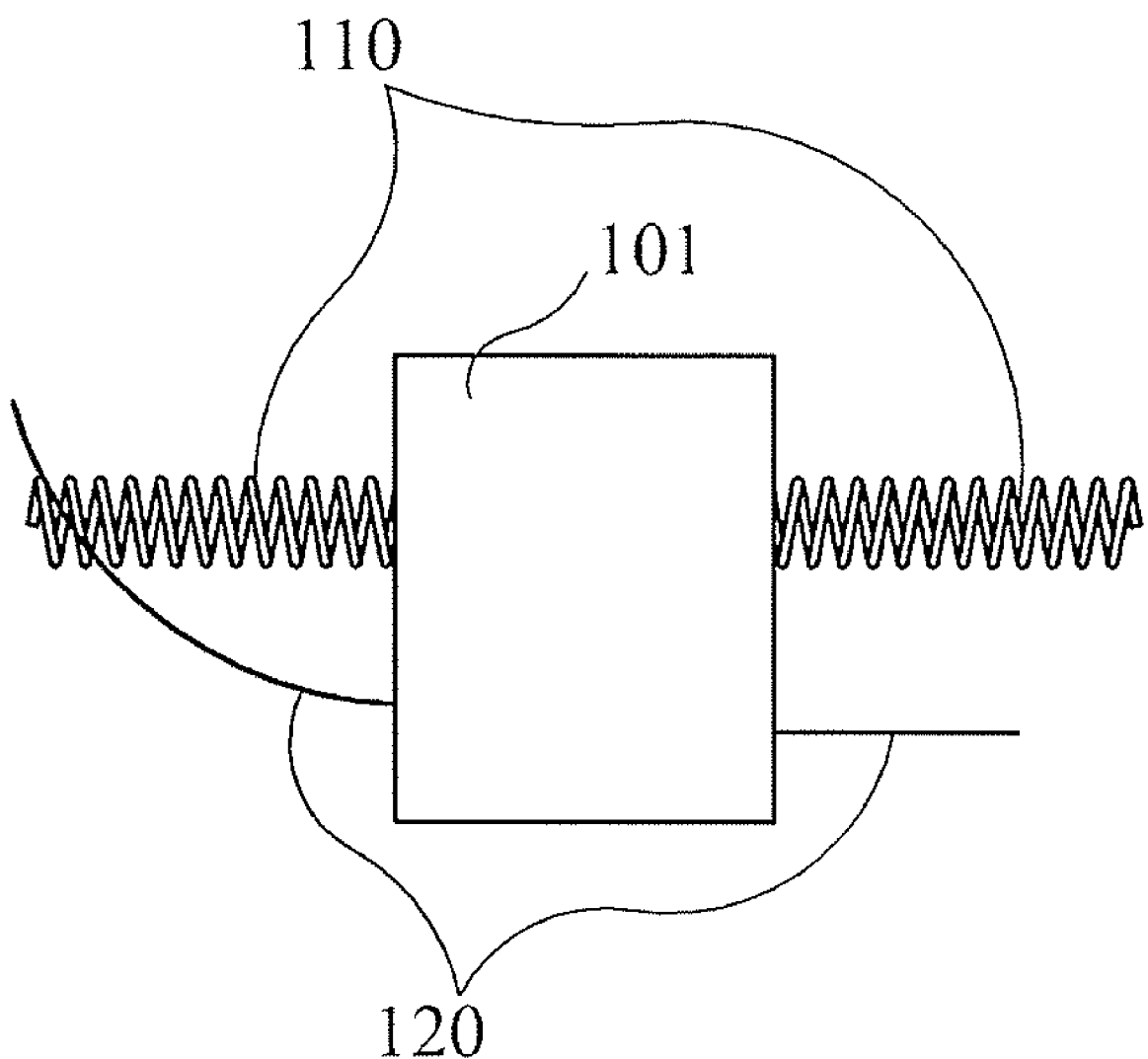
FIG. 1A is a view showing characteristics of a conventional lens.
Figure 1B:
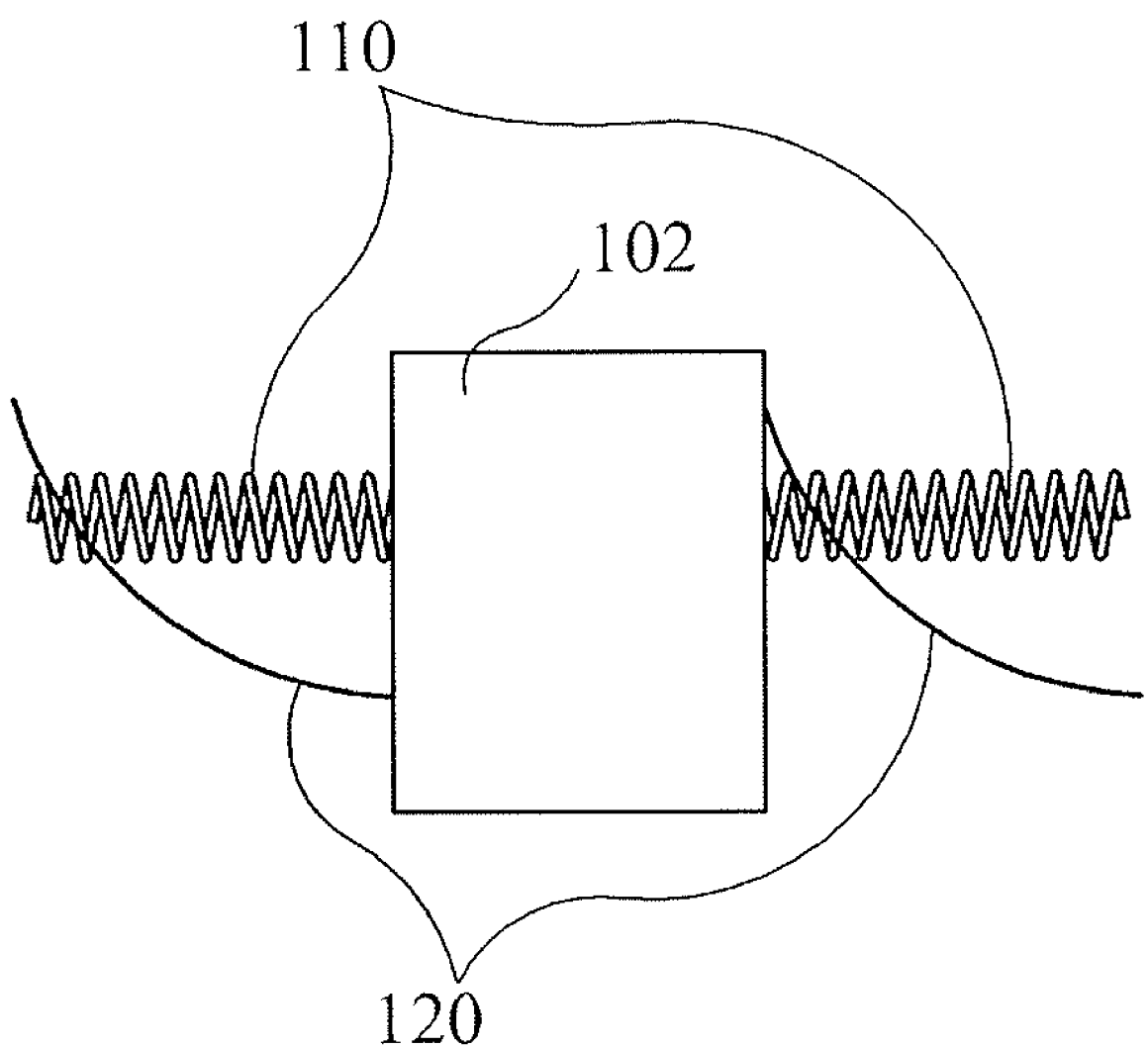
FIG. 1B is a view showing characteristics of a conventional superlens.
Figure 1C:
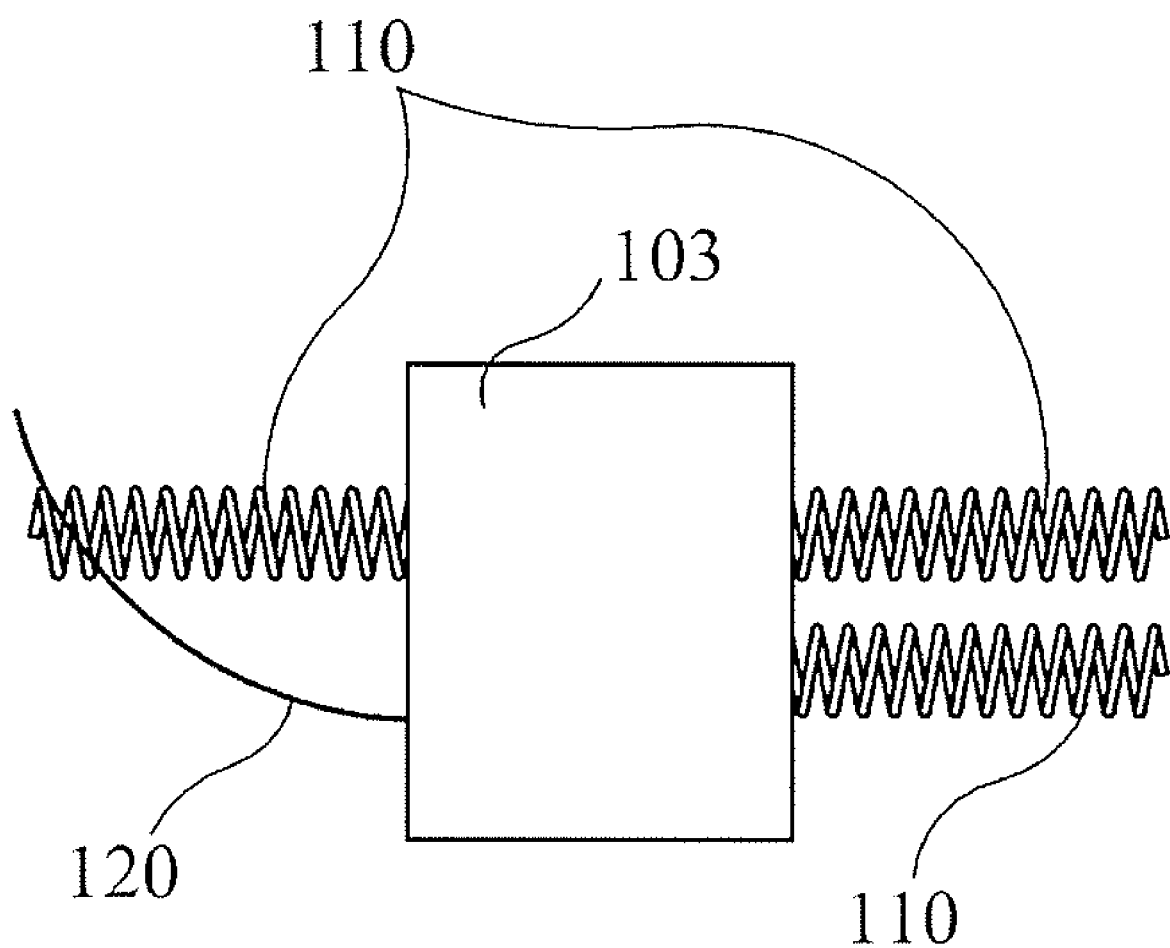
FIG. 1C is a view showing characteristics of a conventional hyper-lens.
Figure 2:
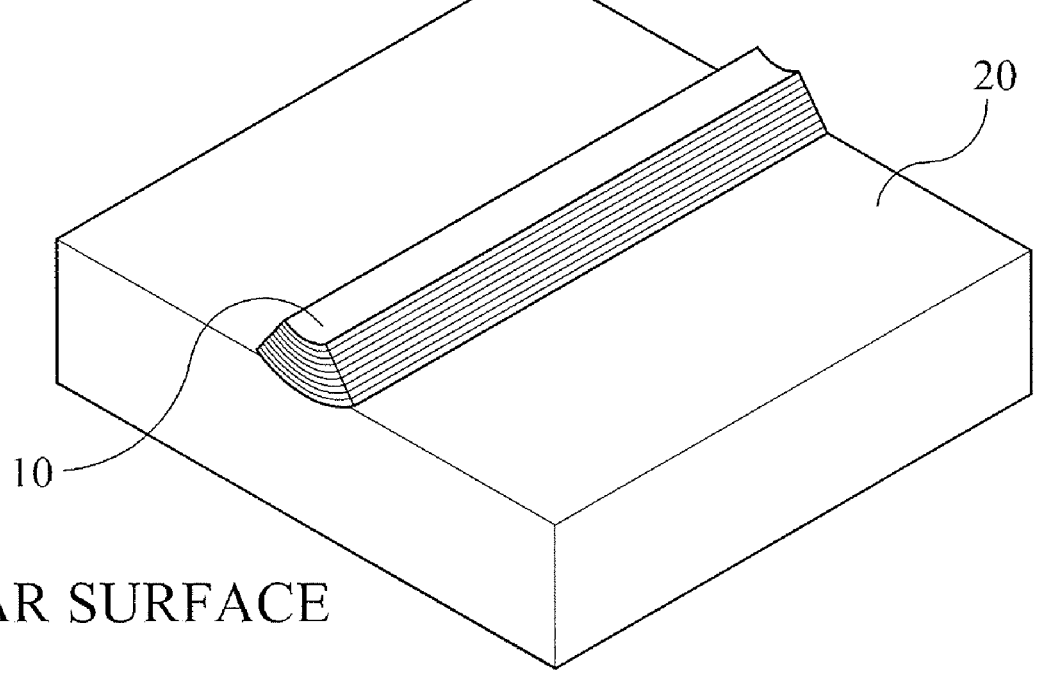
FIG. 2 is a perspective view showing a portion of an exemplary projecting type hyper-lens.
Figure 3:
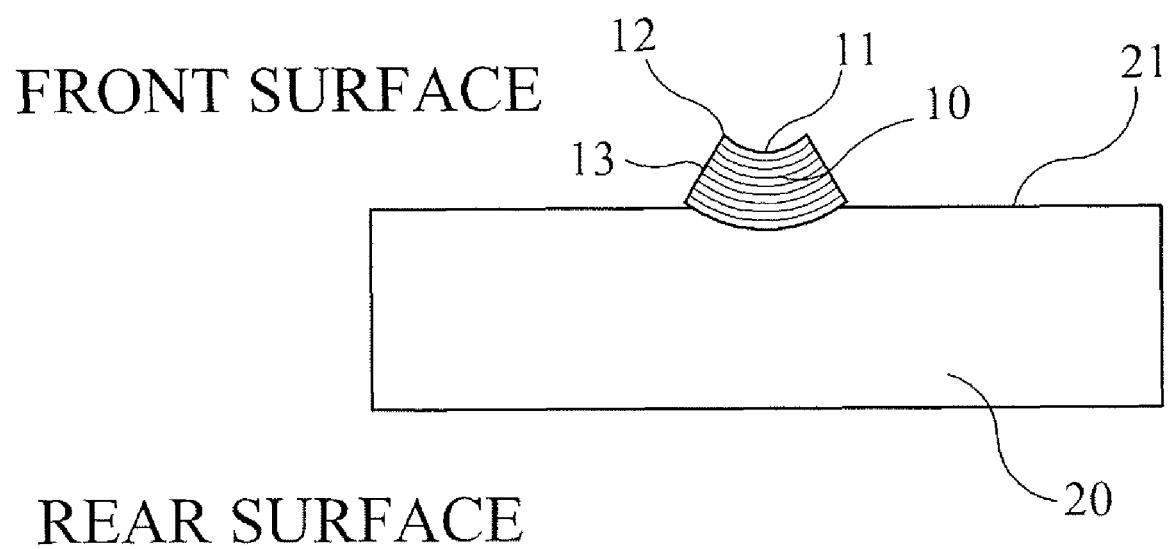
FIG. 3 is a cross sectional view showing the projecting type hyper-lens of FIG. 2.

FIG. 2 is a perspective view showing a portion of an exemplary projecting type hyper-lens, and FIG. 3 is a sectional view showing the projecting type hyper-lens of FIG. 2.

As shown in FIGS. 2 and 3, the projecting type hyper-lens includes a main lens layer 10 and a substrate layer 20.

The main lens layer 10 has a front surface having a recessed shape.

The substrate layer 20 supports the main lens layer 10 and is formed of quartz.

In particular, a front central portion 11 of the main lens layer 10 protrudes beyond a surface 21 of the substrate layer 20. Accordingly, a distance between a front surface of the main lens layer 10 and an object is smaller than a half-wavelength of used light. Such a projecting type hyper-lens is suitable for viewing a fine object having a size smaller than half a wavelength of the light.

FIG. 4 is a sectional view showing the projecting type hyper-lens shown in FIG. 2 in use.

That is, as show in FIG. 4, objects 30 are mounted on a substrate 40 while being spaced apart from each other by a distance smaller than a half-wavelength of used light. For example, the light has a wavelength of about 365 nm, and the objects 30 are spaced apart from each other by a distance of about 150 nm. The evanescent wave of light 31 coming from the object 30 radially passes through the main lens layer 10 which leads to magnification. After that, the evanescent wave, which has passed through the main lens layer 10, is emitted through a rear surface of the substrate layer 20. As described above, the evanescent wave component of the light 31 coming from the object 30 is not attenuated so much while passing through the main lens layer 10 due to the anisotropic metamaterial nature of alternative dielectric and conductor layers and is changed into a propagating wave component after passing the main lens layer 10. Such a propagating wave component forms a magnified image at a location remote from the rear surface of the substrate layer 20.

That is, such a projecting type hyper-lens is suitable for viewing an object having a size smaller than a half wavelength of used light as compared with a non-projecting type hyper-lens. Hereinafter, the projecting type lens will be described in terms of a structural improvement of the projecting type lens by comparing the projecting type lens with conventional non-projecting type hyper-lenses.

Figure 5A:
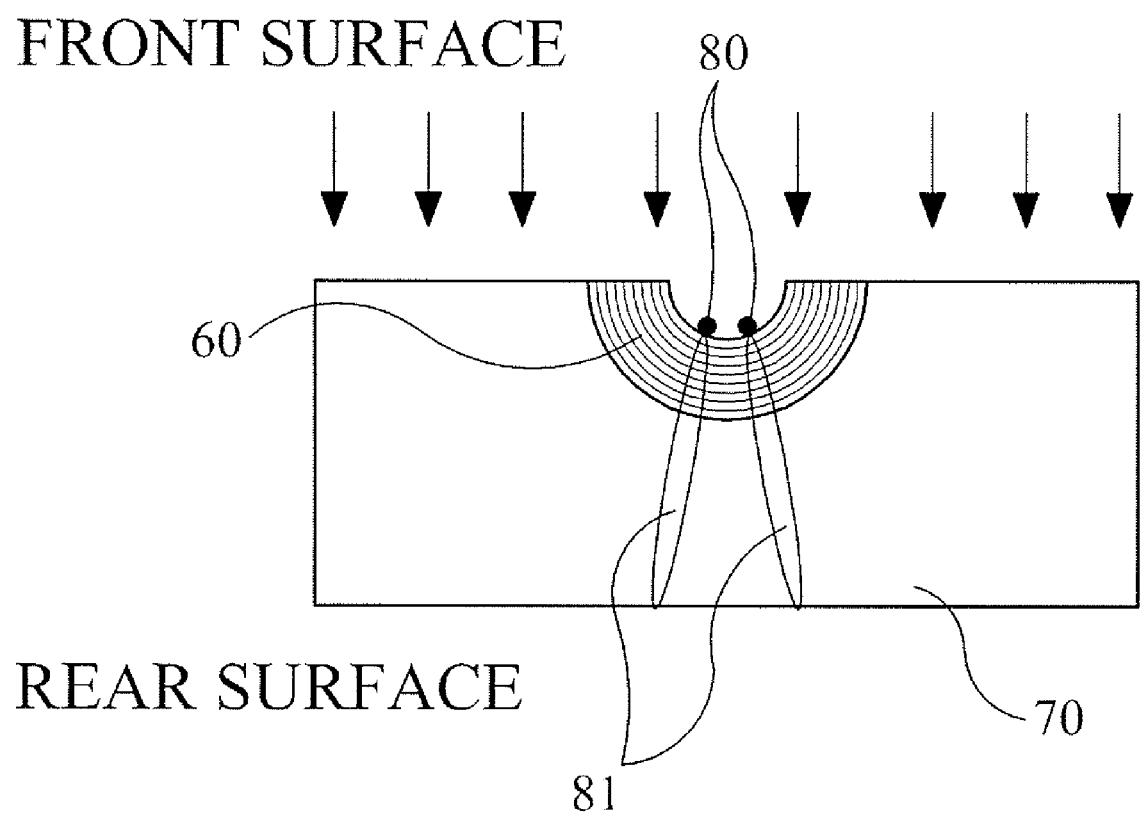
FIG. 5A is a cross sectional view showing an exemplary conventional non-projecting type hyper-lens viewing non-practical object for a demonstration.
Figure 5B:
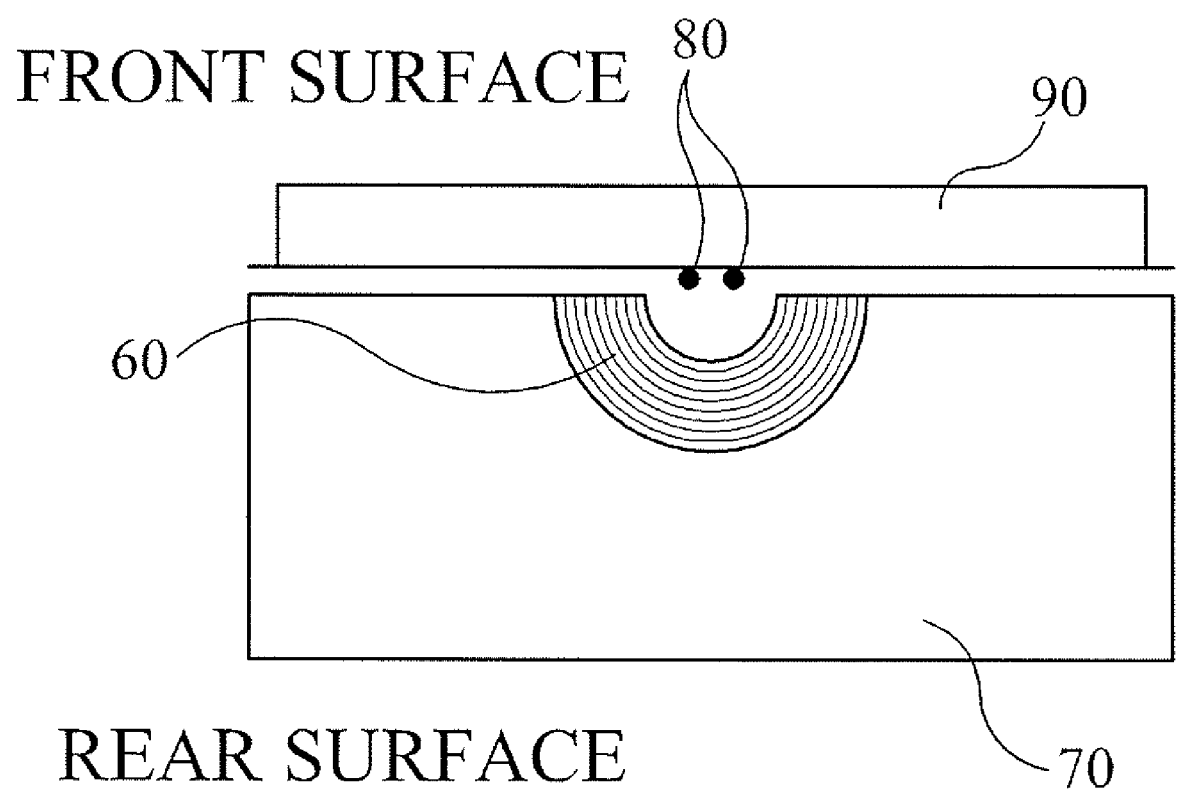
FIG. 5B is a cross sectional view showing another exemplary conventional non-projecting type hyper-lens viewing practical objects.

FIG. 5A is a sectional view showing a conventional exemplary non-projecting type hyper-lens, and FIG. 5B is a sectional view showing another conventional exemplary non-projecting type hyper-lens.

As shown in FIG. 5A, the non-projecting type hyper-lens is provided with a main lens layer 60. The main lens layer 60 is formed by forming a groove in a substrate layer 70 in the form of a semi-cylinder and then alternately stacking a dielectric substance thin film including $Al_2O_3$ and a metal thin film including Ag for example. The dielectric substance thin film and the metal thin film each have a thickness of 35 nm and are coaxially formed in the form of a semicylinder. Objects 80 are formed on an upper side of the main lens layer 60 while being spaced apart from each other by a distance of about 150 nm which is smaller than a half-wavelength of used light. In this case, the objects 80 are engraved in a line shape parallel to the axis of the groove on the upper side of the main lens layer 60.

If light having a wavelength of 365 nm is radiated normally to the front surface of the main lens layer 60, some evanescent components scattered by the objects propagates to the radial direction and form a magnified far field image behind the substrate.

In practice, the objects 80 are not engraved on the front surface of the main lens layer 60 but are placed on a substrate layer 90 as described in FIG. 5B. Accordingly, in order for a user to view the objects 80 placed on the substrate layer 90, the objects 80 need to be moved adjacent to the main lens layer 60 until a distance between the objects 80 and the main lens layer 60 is smaller than a half-wavelength of used light. However, in the process of moving the objects 80 toward the main lens layer 60, the substrate layer 90 where the objects 80 are mounted may come into contact with the substrate layer 70 where the main lens layer 60 are mounted.

Different from such a conventional hyper-lens, according to the projecting type hyper-lens of the present invention, the front central portion of the main lens layer protrudes beyond a front surface of the substrate layer, so that the object to be viewed can be effectively adjacent to the main lens layer as compared with the non-projecting type hyper-lens.

Meanwhile, as shown in FIGS. 3 and 4, a foremost portion 12 of the front surface of the main lens layer 10 is spaced apart from the front central portion 11 of the main lens layer 10 by a distance smaller than a half-wavelength of used light. Accordingly, if the substrate 40, on which the object 30 is arranged, is pressed against the foremost portion 12, then as a result the object 30 will be adjacent to the front central portion 11 due to the shape of the main lens layer 10 and will be within a half-wavelength of the light from the front central portion 11.

In addition, the main lens layer 10 has a sectional area which is larger toward the rear surface thereof. That is, the side walls of the main lens layer 10 are not parallel and converge to a point, so that the light incident onto the front surface of the main lens layer 10 is effectively emitted in a radial manner.

In addition, the main lens layer 10 is formed by alternately stacking a dielectric substance thin film and a metal thin film against on each other.

FIG. 6 is a flowchart showing an exemplary method of manufacturing a projecting type hyper-lens.

As shown in FIG. 6, an exemplary method of manufacturing a projecting type hyper-lens is performed as follows. First, a non-projecting type hyper-lens is formed (operation 100). After that, a photoresist is subject to a masking process. And then, a main lens layer and a substrate layer are etched such that a front central portion of the main lens layer protrudes beyond a surface of the substrate layer (operation 400). Finally, the photoresist used for masking is removed (operation 500).

The masking of the photoresist includes coating photoresist on the front surface of the substrate layer and the main lens layer (operation 200) and removing a portion of the photoresist which does not correspond to a central portion of the main lens layer (operation 300).

In the masking of the photoresist, the remaining photoresist is formed to extend vertically from the central portion of the main lens layer forward while maintaining a predetermined width.

The remaining photoresist has a width smaller than an inner diameter of the main lens layer.

Meanwhile, in the removing photoresist which does not correspond to the central portion of the main lens layer (i.e. the portion which is to be removed), an exposure process is performed on the portion of photoresist to be removed and then a development process is performed on the exposed portion.

FIGS. 7A to 7F are sectional views showing an exemplary method of manufacturing a projecting type hyper-lens.

Figure 7A:
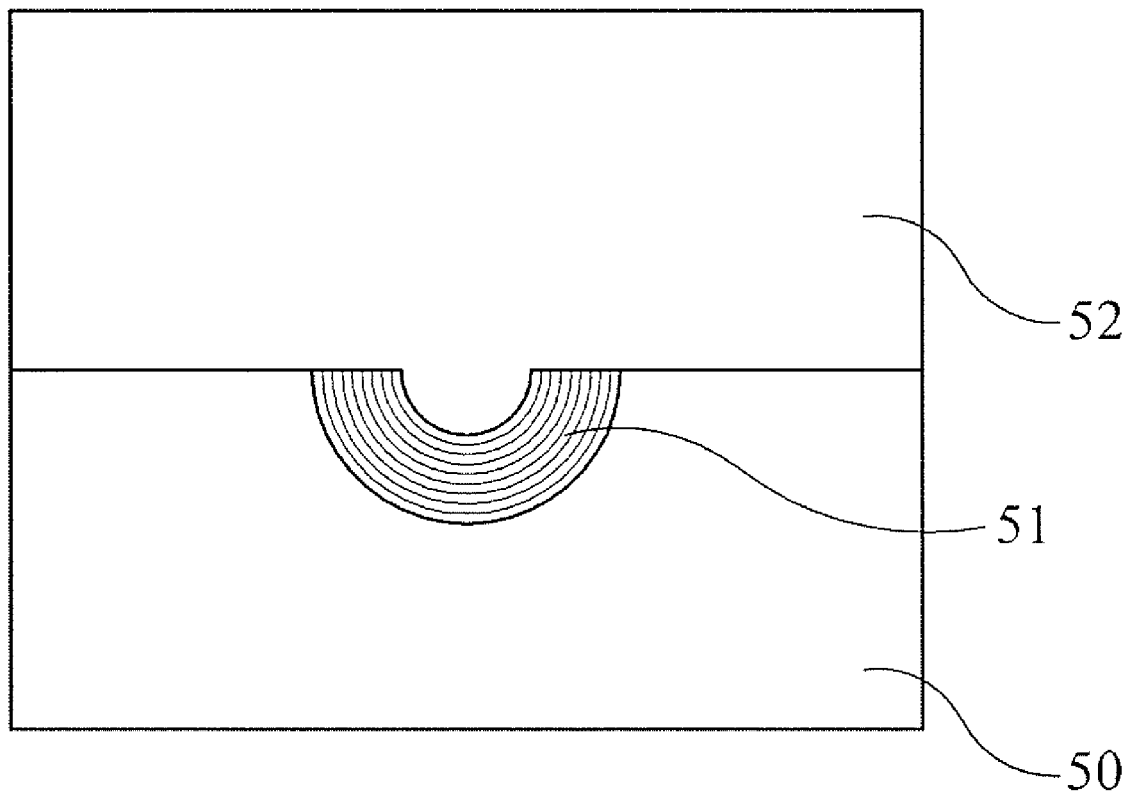

FIG. 7A shows a non-projecting type hyper-lens (operation 100, in FIG. 6) with is photoresist coated on the front surface. The non-projecting type hyper-lens includes a substrate layer 50 and the main lens layer 51. The main lens layer 51 is supported by the substrate layer 50 and has a recessed shape.

As shown in FIG. 7A, a photoresist 52 is coated on the front surface of the substrate layer 50 (operation 200, in FIG. 6). The photoresist 52 is used to prevent a portion of the main lens layer 51, which is required to not be removed, from being etched through a subsequent etching process.

Figure 7B:
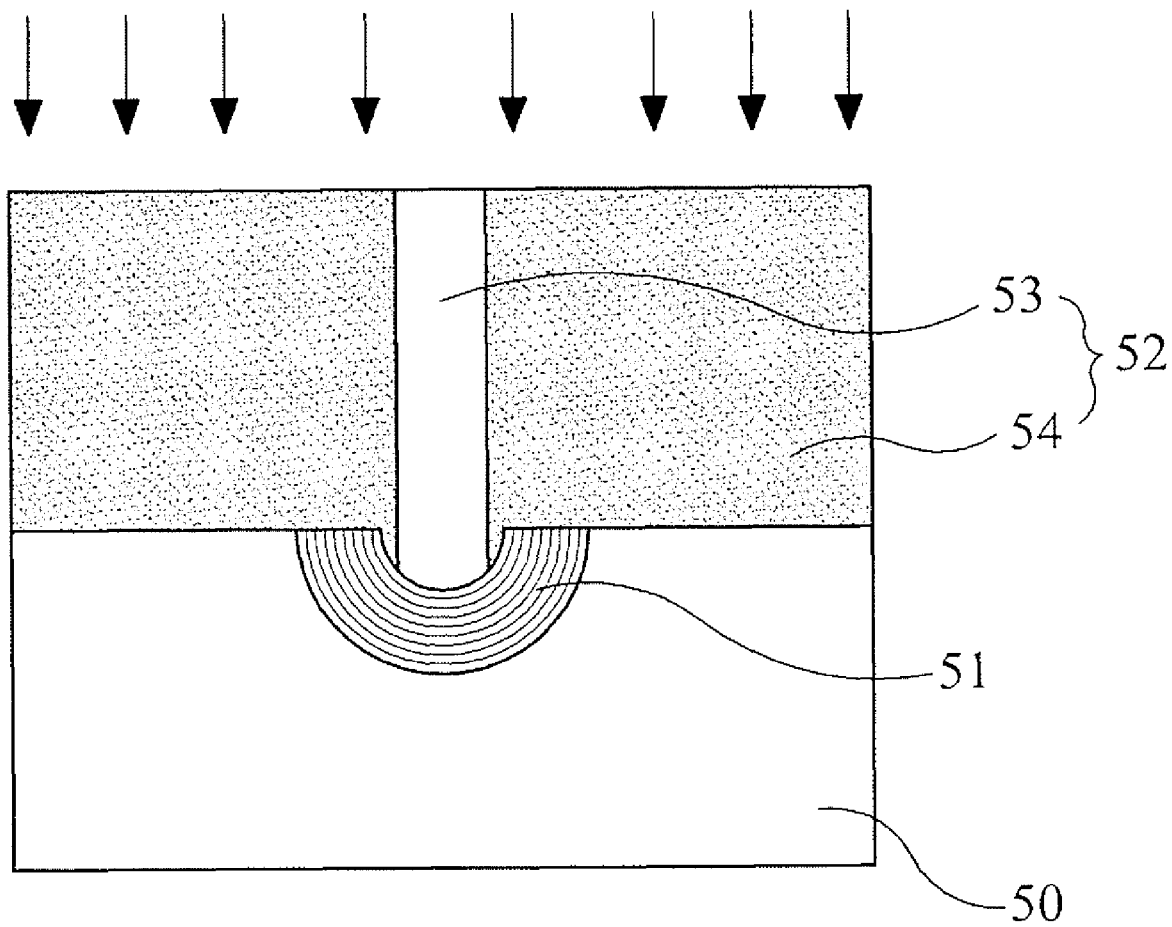

FIG. 7B shows a process of removing a portion of the photoresist 52, which does not correspond to the central portion of the main lens layer 51 (operation 300, in FIG. 6). If the photoresist is positive photoresist, the portion of the photoresist 52 to be removed is subject to the exposure. That is, not entire photoresist is subject to the exposure, but a remaining portion 54 of the photoresist 52 except for a portion 53 is subject to the exposure. In this case, the portion 53 of the photoresist 52 which is not subject to the exposure extends vertically from the front central portion of the main lens layer 51. The portion 53 of the photoresist has a width smaller than an inner diameter of the main lens layer 51.

For example, the exposure is performed on the photoresist 52 through UV lithography or e-beam lithography. UV and e-beam cause a chemical reaction on the resist in the UV-lithograpy and the e-beam lithography, respectively.

FIG. 7C shows the portion 53 of photoresist 52, which is not subject to the exposure, remains on the front surface of the main lens layer 51 after development (operation 300, in FIG. 6).

The above description has been made in relation to the photoresis 52 having a positive property as an example with reference to FIGS. 7B and 7C. Various schemes capable of removing the remaining 54 of the photoresist 52 may be used other than the above scheme.

Figure 7D:
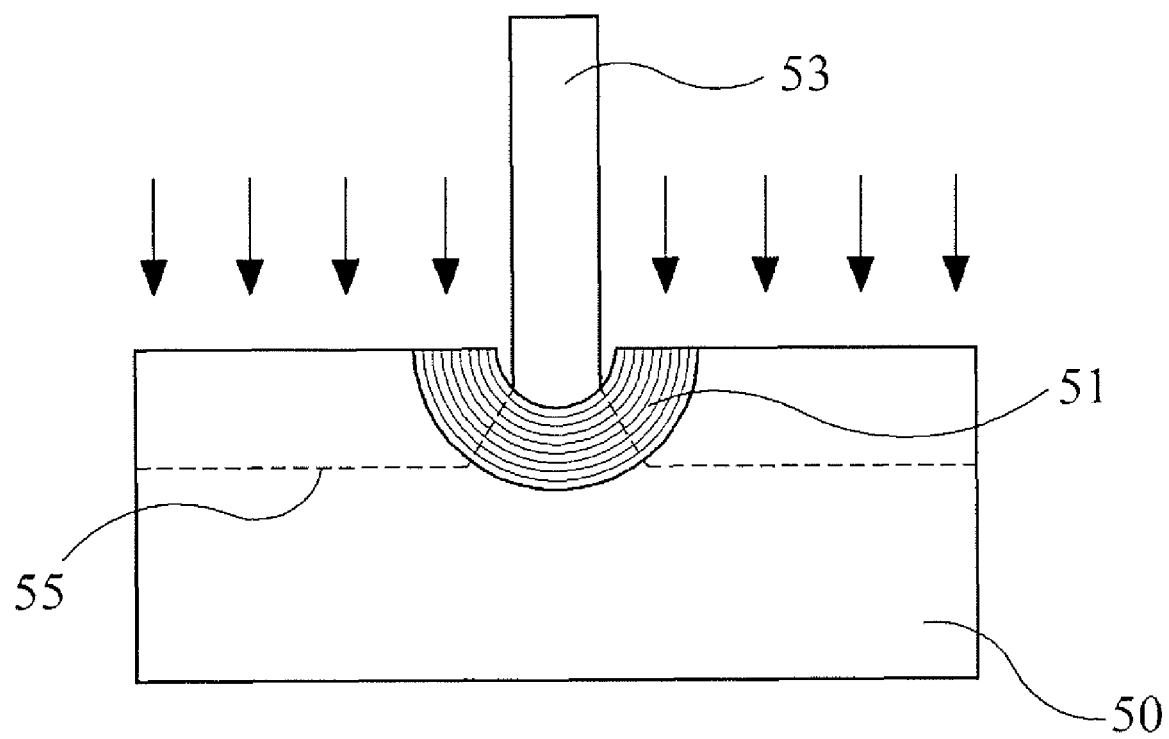

FIG. 7D shows a process of etching portions of the substrate layer 50 and the main lens layer 51 unmasked by photoresist 53 (operation 400, in FIG. 6). In this case, the portions of the substrate layer 50 and the main lens layer 51 beyond a dotted line 55 are etched. The etching of the substrate layer 50 and the main lens layer 51 is realized through a dry etching or a wet etching.

Figure 7E:
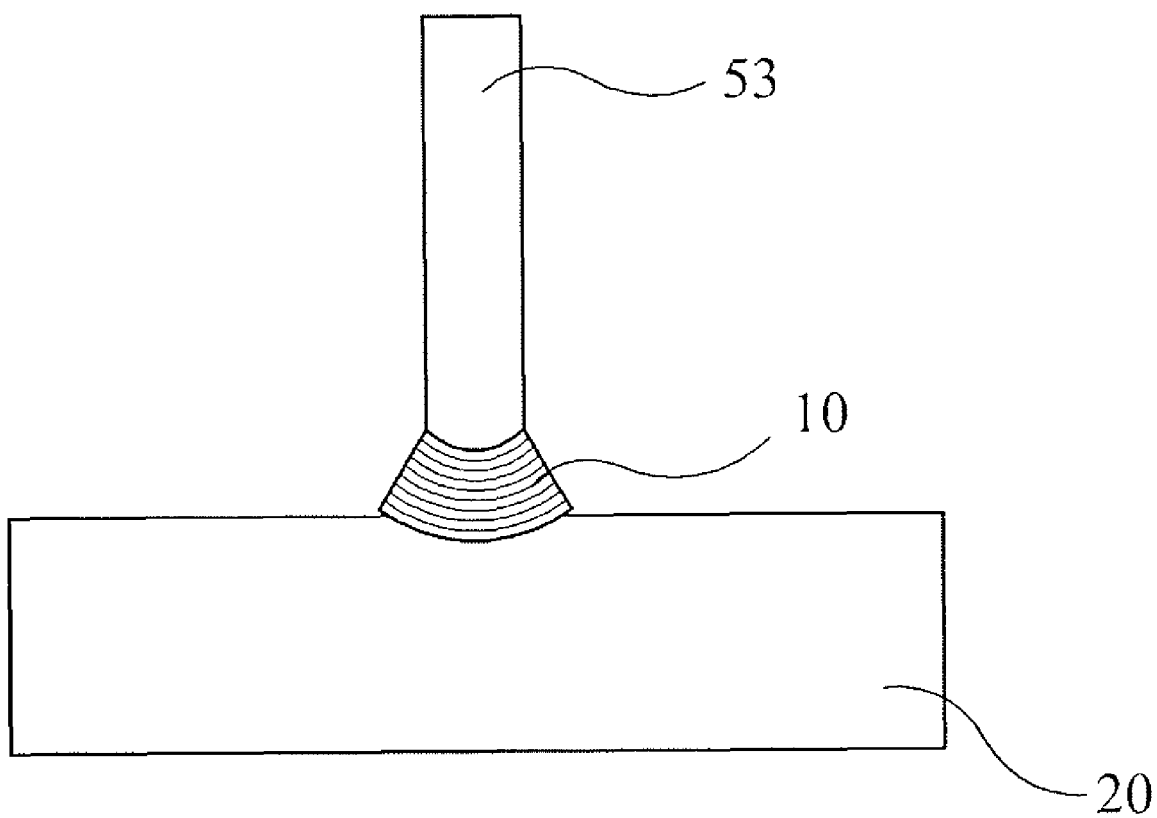
Figure 7F:
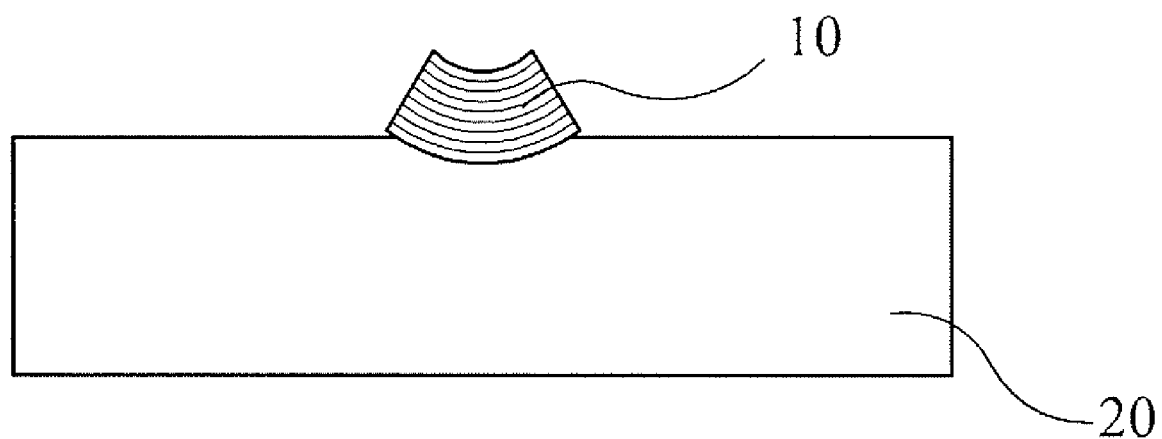

FIG. 7E shows a cross sectional view after etching processing is finished. FIG. 7F shows a cross sectional view after the blocking photoresist is removed.

Meanwhile, in the etching (operation 400, in FIG. 6), the foremost point of the front surface of the main lens layer is spaced apart from the front central portion of the main lens layer 10 by a distance smaller than a half-wavelength of used light.

In addition, in the etching (operation 400, in FIG. 6), both side walls of the main lens layer 10 are not parallel and converge to a point such that the main lens layer has a cross sectional area which is larger toward the rear surface. To this end, reactant gas including ethanol $CF_4$ and oxygen $O_2$ is used in the etching process. Such an etching process may be implemented in a manner to control an etching rate based on the oxygen content contained in the reaction gas.

Meanwhile, in the forming of the non-projecting type hyper-lens (operation 100, in FIG. 6), a groove is formed in the front surface of the substrate layer (50, in FIG. 7A) in the form of a semicylinder or a semisphere, and then the main lens layer (51, in FIG. 7A) is formed in the groove through a stacking sheme.

In this case, the main lens layer (51, in FIG. 7A) is formed by alternately stacking an aluminum oxide ($Al_2O_3$) thin film and a silver (Ag) thin film that each have a thickness of about 30 nm to 40 nm. The aluminum oxide thin film and the silver thin film are coaxially formed in the form of a semicylinder.

Although few embodiments of the present invention have been shown and described, the above embodiment is illustrative purpose only. It will be apparent to those of ordinary skill in the art that various modifications can be made to the exemplary embodiments of the invention described above. However, as long as modifications fall within the scope of the appended claims and their equivalents, they should not be misconstrued as a departure from the scope of the invention itself.

What is claimed is:

1. A projecting type hyperlens for forming an image of an object using an evanescent wave component of light coming from the object, the projecting type hyper-lens comprising:
   a main lens layer, a front surface of which is recessed; and
   a substrate layer for supporting the main lens layer,
   wherein a front central portion of the main lens layer protrudes beyond a surface of the substrate layer.

2. The projecting type hyper-lens of claim 1, wherein a foremost portion of the front surface of the main lens layer is spaced apart from the front central portion of the main lens layer by a distance smaller than a half-wavelength of the light.

3. The projecting type hyper-lens of claim 1, wherein the main lens layer has a sectional area which is larger toward a rear surface of the main lens layer.

4. The projecting type hyper-lens of claim 1, wherein the main lens layer is formed by alternately stacking a dielectric substance thin film and a metal thin film on each other.

5. The projecting type hyper-lens of claim 1, wherein the dielectric substance thin film and the metal thin film each have a thickness of 100 nm or less.

6. The projecting type hyper-lens of claim 4, wherein the dielectric substance thin film includes aluminum oxide ($Al_2O_3$) and the metal thin film includes silver (Ag).

* * * * *